(No Model.)
N. D. STANLEY.
NUT LOCK.
No. 530,290. Patented Dec. 4, 1894.
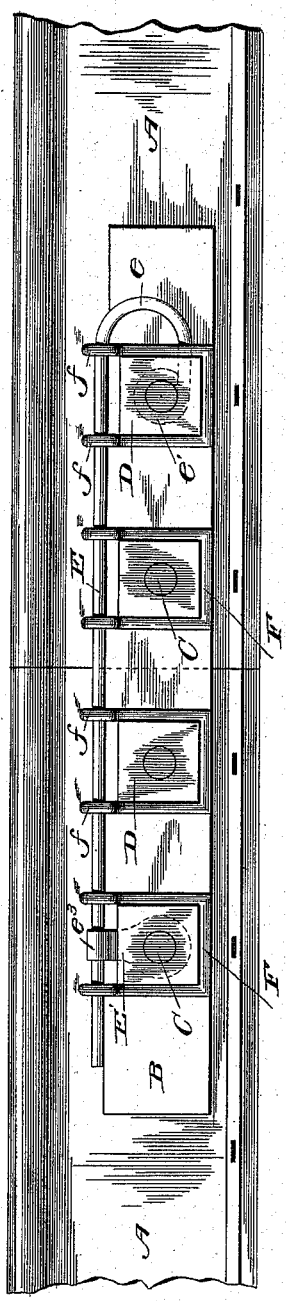
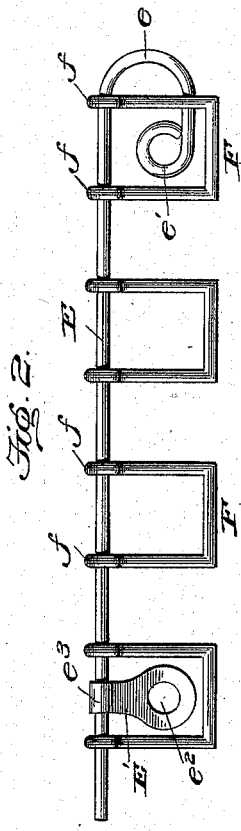
Witnesses
N. D. Stanley,
Inventor

UNITED STATES PATENT OFFICE.

NELSON D. STANLEY, OF ESSEX JUNCTION, VERMONT.

NUT-LOCK.

SPECIFICATION forming part of Letters Patent No. 530,290, dated December 4, 1894.

Application filed October 8, 1894. Serial No. 525,212. (No model.)

*To all whom it may concern:*

Be it known that I, NELSON D. STANLEY, a citizen of the United States, residing at Essex Junction, county of Chittenden, and State of Vermont, have invented certain new and useful Improvements in Nut-Locks, of which the following specification is a full, clear, and exact description, reference being had to the accompanying drawings, forming part thereof, in which—

Figure 1 is a side elevation of my improved nut-lock applied and Fig. 2 shows the same detached.

The object of the invention is to provide a nut-lock which will lock a series of nuts regardless of the distances which may separate them one from the other and also lock the nuts of the fish plate bolts even though the space between the adjacent rail ends may vary considerably.

The invention consists in the construction and arrangement of parts hereinafter described and claimed.

In the drawings A A represent the adjacent ends of the rails.

B is one of the fish plates provided as usual with a series of bolt holes and C are the securing bolts provided as usual with the nuts D.

The improved nut-lock comprises a round rod E of a length to extend over the several nuts and provided at one end with a fixed or integral curved arm $e$ terminating in an eye $e'$. The opposite end of the rod is provided with a separate supporting arm E' having a bolt aperture $e^2$ at the lower end and an eye $e^3$ at right angles thereto on its upper end.

F represents a series of yokes or U-shape arms provided at their upper ends with eyes $f$ which loosely receive the rod E so that the yokes or arms are free to swing outwardly and upwardly on the rod and also to be slid thereon as occasion may require. These yokes are large enough to embrace or straddle the several nuts.

The operation is as follows: The fish plates are placed in position on the rail ends and the bolts are passed through the aligned plate and rail apertures. The supporting arm E' is placed on one of the end bolts with the eye $e^3$ extending above the upper edge of the nut and the nut is screwed in place thus clamping the arm in proper position. The straight end of the rod E is then passed through the eye $e^3$ and slid along until the eye $e'$ at its opposite end is brought into register with the bolt at the opposite end of the fish plate and is passed thereon and the nut screwed inwardly to clamp the rod firmly in place. The several yokes F carried by the rod E will now be slid along the rod into proper position and then swing down over the several nuts; the two intermediate nuts having been previously screwed into proper position.

It will be seen that any yoke may be swung up to permit the nut to be tightened, loosened or removed, and that owing to the rod having a longitudinal adjustment at one end, in the support E', the distance between the rail ends will not affect the proper engagement of the entire series of yokes F with the nuts. The expansion and contraction of the rails will not affect the nut-lock at all as the yokes are free to slide on the rod and the rod is free to slide through the eye $e^3$.

Having thus described my invention, what I claim as new, and desire to secure by Letters Patent, is—

1. A nut-lock comprising a rod to extend over a plurality of nuts and provided with supports adapted to be secured by said nuts, and a plurality of outwardly and upwardly swinging nut-locking arms or yokes, mounted on the said rod and movable longitudinally thereon, substantially as set forth.

2. A nut-lock comprising a rod to extend over the nuts, and provided with supports adapted to be secured in place by the nuts; the rod being free to slide through one of the supports, and a plurality of nut-engaging arms or yokes mounted to slide along the rod and swing upwardly and outwardly thereon, substantially as set forth.

3. A nut-lock comprising a rod to extend over a plurality of nuts, and having supports adapted to be secured in place by certain of the nuts, and a plurality of nut-locking arms, movable along the rod and adapted to engage the nuts and be in turn held from longitudinal movement on the rod thereby, substantially as set forth.

4. A nut-lock comprising the rod E having an integral arm at one end and provided with a bolt aperture or eye, a supporting arm E' having an eye $e^3$ at its upper end through which the rod freely passes, and provided with a bolt aperture $e^2$ at the lower end, and a series of locking arms or yokes F having eyes $f$ through which the said rod freely passes to permit the arms or yokes to slide and turn thereon, substantially as set forth.

NELSON D. STANLEY.

Witnesses:
L. B. WILLEY,
I. H. LUNT.